March 17, 1970  C. L. G. BENARD  3,501,626
RADIATION CONDENSER DEVICES
Filed March 16, 1967  4 Sheets-Sheet 1
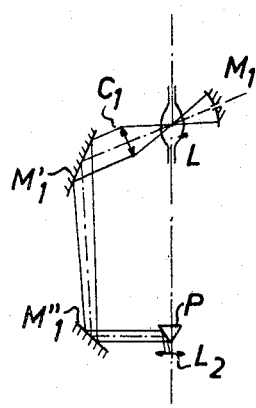
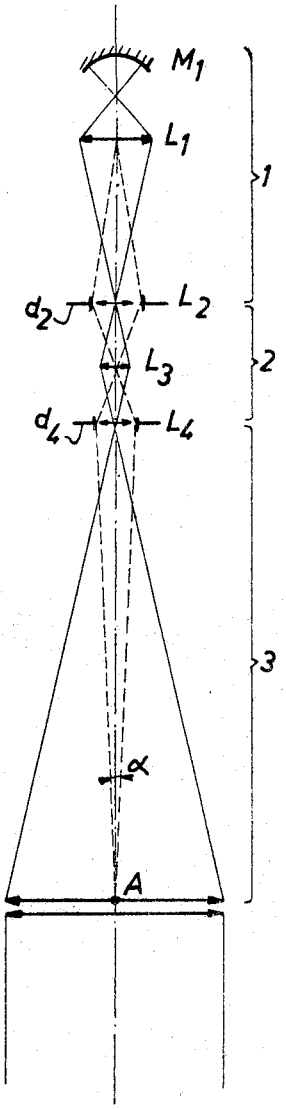

United States Patent Office 3,501,626
Patented Mar. 17, 1970

3,501,626
RADIATION CONDENSER DEVICES
Christian Louis Georges Benard, Paris, France, assignor to Anciens Etablissements Barbier, Benard & Turenne, Paris, France, a joint-stock company of France
Filed Mar. 16, 1967, Ser. No. 623,695
Claims priority, application France, Apr. 6, 1966, 56,746; Nov. 16, 1966, 83,877
Int. Cl. F21v 9/02
U.S. Cl. 240—1.1                               3 Claims

ABSTRACT OF THE DISCLOSURE

A radiation condenser device for simulating the luminance of the sun has a light source about which a plurality of elementary condenser systems are symmetrically placed. Each elementary condenser system has a spherical mirror centered on the light source and a condenser lens on the opposite side of the light source and in line with the light source and spherical reflector. Light passes from the spherical mirror and light source through the condenser lens onto a first plane mirror which directs the light onto a second plane mirror. The second plane mirror directs the light onto a multi-sided prism which combines the light from the plurality of elementary condenser systems into a single beam. Down stream of the prism additional lenses are provided along with parabolic reflectors for securing a uniform beam.

---

The present invention relates to an improved radiation condenser device, especially intended for the production of optical solar-simulation devices.

In patent application No. 432,698, filed by the present applicant on Feb. 15, 1965, now Patent No. 3,387,128, there has been described an improved condenser device comprising essentially at least one source of light and a certain number of elementary condenser systems having a small opening, with uniform illumination, each comprising for example a condenser lens and an objective which is placed on the image of the source through the condenser lens or in an adjacent plane, this objective itself forming the image of the uniformly illuminated condenser lens on the surface to be irradiated, and these elementary systems being associated with each other in such manner that all the said images of each condenser lens through each objective overlap each other so as to give a uniform lighting of the surface to be irradiated, each elementary system taking a part of the flux emitted by the source and being capable of effecting individually a modification of the spectral distribution of the resulting radiant flux.

Now, in order to obtain the best possible optical solar simulation device utilized for example for tests on spatial vehicles or parts of such vehicles, it is often necessary that the surface to be irradiated should be illuminated by a beam of light which, in addition to the uniformity of illumination produced and also the spectral distribution obtained in accordance with the invention described in patent application No. 432,698, has a divergence identical with that of solar radiation, namely on the average 32 sexagesimal minutes of arc, which represents effectively the mean apparent diameter of the solar disc seen from the irradiated surface.

An object of the present invention is to provide a solar simulation device utilizing the improved radiation condenser device referred to above, and optical means intended to produce with precision the collimation of 32 sexagesimal minutes of arc representing the apparent diameter of the sun seen from the surface to be irradiated.

In addition, the present invention has also for its object to provide other alternative forms of the optical solar simulation device such as referred to above, and more particularly intended to give uniform illumination of larger surfaces while obtaining with precision the collimation necessary to reproduce the apparent diameter of the sun.

Such solar simulation devices are capable of being utilized for example for thermal or energy tests or for designs of large detectors intended for space vehicles.

To this end, and following a first form of construction of an optical solar-simulation device according to the invention, there is associated with the said improved condenser device, an optical device intended to give the above improved condenser device an image of uniform luminance appropriate with respect to that of the sun which it is desired to simulate, and the apparent diameter of which corresponds to the apparent diameter of the sun, as seen from the surface to be irradiated.

According to a second form of construction of a solar-simulation device of this kind, there is associated with the improved condenser device illuminating a convergent lens of large focal distance, an assembly of two similar conjugated parabolic mirrors, the axes and the focal point of which are coincident, the common axis of these two mirrors being disposed outside the axis of the above radiation condenser device.

In accordance with another alternative of the second form of construction above, the optical solar-simulation device is constituted by a group of $n$ elementary or modular condenser systems, distributed uniformly over an emitting area, and by as many systems of two conjugated parabolic mirrors such as referred to above.

Other advantages and characteristic features of the present invention will become apparent from the description which follows below, reference being made to the accompanying drawings, in which:

FIG. 1 is a diagram of an alternative form of construction of the improved radiation condenser device in accordance with the invention;

FIG. 2 is a simplified diagram of the above first form of construction of a solar-simulation device forming the object of the present invention and which utilizes with advantage the improved condenser device of FIG. 1;

Referring now to FIG. 1, the alternative form of the improved radiation condenser device according to the invention comprises a source of light L, for example of the short arc discharge type, around which there are uniformly arranged 8 identical elementary systems, each comprising a spherical mirror $M_1$ to $M_8$, centered on the source L or in its vicinity, and placed behind the source, and a lens condenser $C_1$ to $C_8$ having a small opening, the optical axis of which passes through the centre of the source L, this lens being itself uniformly illuminated by the source L. In this form of construction, two rings of plane mirrors, $M'_1$ to $M'_8$ and $M''_1$ and $M''_8$ respectively, are intended to send the 8 elementary beams of light on to an octagonal prism P which makes it possible to assembly the said beams on a single collector lens indicated by $L_2$, on the surface of which the 8 images of the arc source L overlap each other in accordance with the invention.

In FIG. 2, there has been associated with the device 1 an improved radiation condenser according to the invention, an optical device 2 intended to give of the improved condenser device 1, an image at $L_4$ of uniform luminance, in the vicinity of that of the sun to be simulated, or 180,000 stilbs, and the apparent diameter of which corresponds to that of the same sun.

This device 2 is constituted for example by an objective $L_3$ placed on the image or in the vicinity of the image given by the lens $L_2$ of the condenser device 1 and by a lens $L_4$ placed on the image or in the vicinity of the image given by the objective $L_3$, the convergence ratio of this device 2 being such that the apparent diameter of the light image at $L_4$ is that of the sun, namely $\alpha = 32'$ of arc.

At $L_2$ and at $L_4$ it is possible, as has been shown diagrammatically in FIG. 2, to arrange interchangeable diaphragms $d_2$ and $d_4$ respectively, so as to cause the said apparent diameter to vary over an interval of $\pm 30''$ around the mean value, following the cycle of the seasons.

It is also possible to place in front of the lens $L_4$ an absorbent screen having a peripheral graduation so as to reproduce more exactly the variations of luminance at the surface of the solar disc.

A collimator device represented diagrammatically by the group of lenses $L_5$, $L_6$, in which $L_5$ is placed on the plane image given by $L_4$, is uniformly illuminated and permits the passage of the radiant flux through a section of opening of reduced size, such as that of a porthole of a vacuum chamber.

Figure 3:
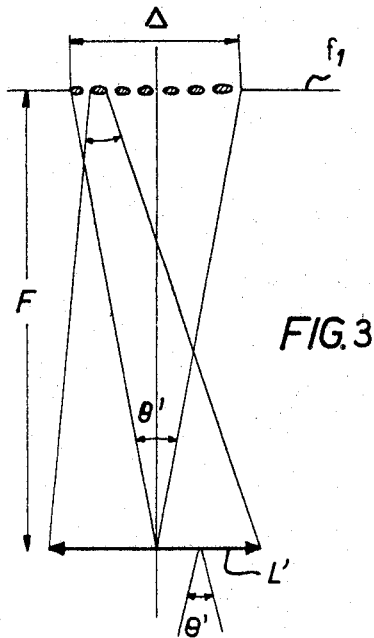
FIG. 3 is an optical diagram setting out the basic principle of the improved radiation condenser device according to the invention.

Referring now to FIG. 3, there has been shown at $f_1$ the focal plane of a convergent lens L' having a large focal distance F. It has furthermore been assumed that the $n$ objectives (indicated by $O_1 \ldots O_5$ in FIG. 2 of the above-mentioned application No. 432,698) of the $n$ elementary condenser devices are arranged in the focal plane $f_1$ of the lens L'. These $n$ objectives in the plane $f_1$ can be considered as forming as many sources of light, uniformly illuminating the lens L' and distributed over a field $\Delta$.

Figure 4:
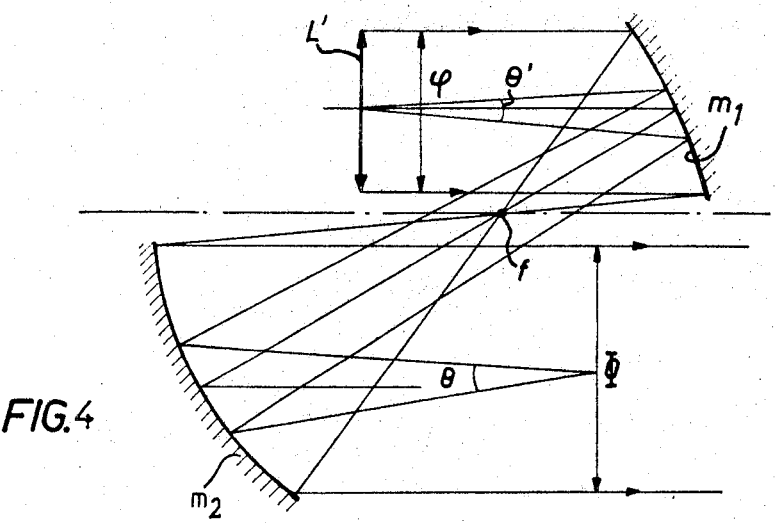
FIG. 4 is a diagram of the solar-simulation device according to the second form of construction referred to above, and which permits the desired collimation and irradiation of a large area.
Figure 5:
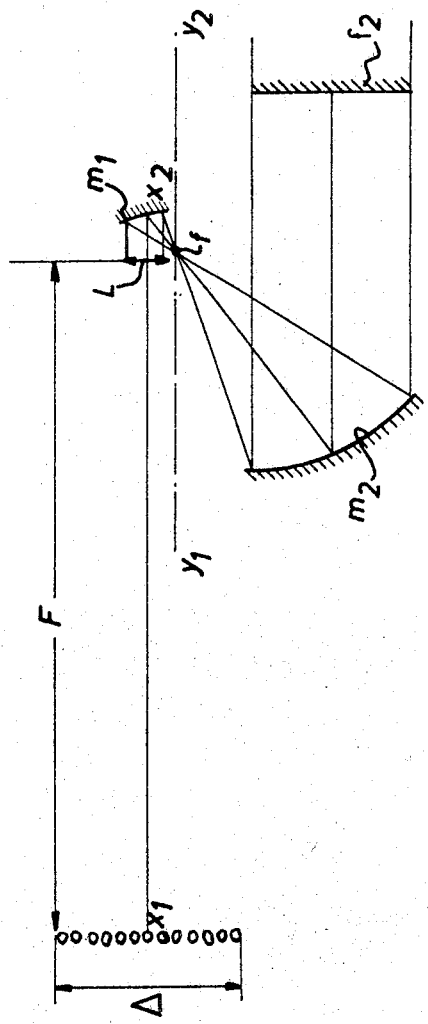
FIG. 5 is a general optical diagram of the above second form of construction of the solar-simulation device according to the present invention, and associating together the optical devices of FIGS. 3 and 4.

As has been shown diagrammatically in FIGS. 4 and 5, in order to illuminate uniformly with parallel light an area $f_2$ of large diameter, there is available an assembly of two similar parabolic and conjugated mirrors $m_1$, $m_2$ having a common axis $y_1$, $y_2$ and a common focal point $f$. The common axis $y_1$, $y_2$ of the two mirrors $m_1$, $m_2$ is displaced with respect to the optical axis $x_1$, $x_2$ of the radiation condenser device ($\Delta L'$).

Thus, at the outlet of the lens L', there is available a beam of diameter $\varphi$ and collimation $\theta'$, illuminating the surface of the first mirror $m_1$. After the two successive reflections on the mirror $m_1$ and on the mirror $m_2$ respectively, there is obtained a beam having a diameter $\phi$ and a collimation angle $\theta$, corresponding to the homothetic relation:

$$\frac{\varphi}{\Phi} = \frac{P_1}{P_2} = \frac{\theta}{\theta'} = K$$

in which $P_1$ and $P_2$ are respectively the characteristic parameters of the parabolic surfaces of the mirrors $m_1$ and $m_2$, the concavity of which is turned in the opposite direction, and K is the homothetic ratio.

Thus, the assembly of the two mirrors $m_1$, $m_2$ can be considered as being a "vehicle" for the emitting area represented by the surface of the lens L' on the surface $f_2$ of large diameter $\phi$, while retaining zero divergence for the irradiating beam.

In addition, it will be observed that the above device according to the invention has the further advantage of permitting the passage of the said beam through a narrow orifice arranged between the two mirrors $m_1$, $m_2$, of which the respective concave faces are turned in opposite directions.

Figure 6:
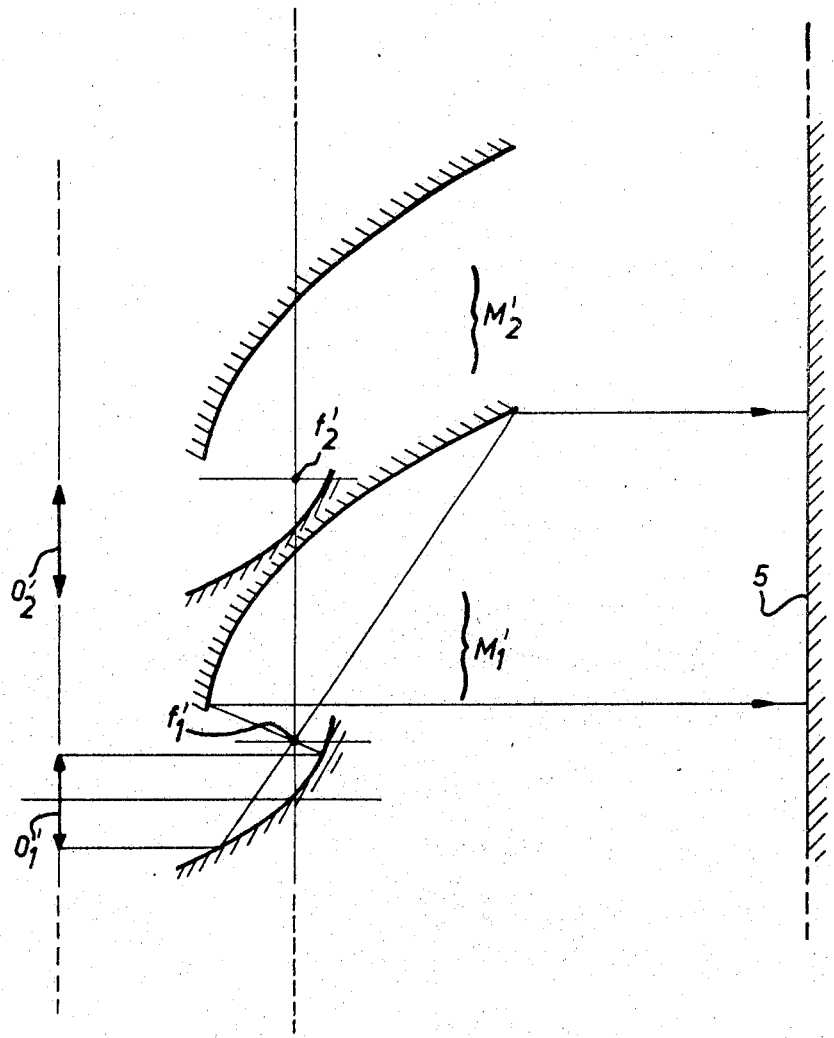
FIG. 6 is an optical diagram of a further alternative form of the device shown in FIG. 5 and associating together a plurality of elementary systems and a plurality of systems with two parabolic mirrors in accordance with FIG. 4.

In the case where it is desired to irradiate uniformly an area 5 with a very large surface, there may be employed the arrangement following the alternative form illustrated diagrammatically in FIG. 6, of a certain number $n$ of modular or elementary condenser devices such as described in the above mentioned patent and shown diagrammatically in FIG. 4 by lenses $O'_1$, $O'_2 \ldots$ associated with a stack of $n$ system $M'_1$, $M'_2 \ldots$ of two conjugated parabolic mirrors, such as previously described. The elementary or modular condenser devices $O'_1$, $O'_2 \ldots$ can be distributed uniformly over a circular area, and the parabolic surfaces of the mirrors must be suitably arranged so as to obtain a cylindrical beam of parallel rays illuminating the circular field 5.

There is thus obtained over the entire irradiated surface of the field 5 the desired uniformity of illumination, and this is effected without the use of cut-off devices, by reason of the particular arrangement of the system of parabolic mirrors, the common axis of which diverges from the optical axis of the radiation condenser device.

Finally, under certain special conditions of use of the irradiated area 5, the focal points of the $2n$ parabolic surfaces of the mirrors may not be disposed in the same plane, contrary to the arrangement of FIG. 6, and the axes of the system $M'_1$, $M'_2 \ldots M'_n$ of these mirrors may even be slightly inclined with respect to the optical axis of the whole of the system, according to the collimation desired.

What I claim is:

1. An optical solar-simulation device comprising:
 a single light source;
 a radiation condenser device disposed around said light source and constituted by the whole of a plurality of elementary condenser systems of small opening disposed symmetrically with respect to said source, each said elementary condenser system comprising a spherical mirror centered on said source and arranged behind said source a condenser lens positioned in front of said source for receiving light from said spherical mirror, a first plane mirror and a second plane mirror, said first plane mirror being positioned in the path of light passing from said spherical mirror through said source and said condenser lens and inclined at an angle for directing said light onto said second mirror, the axis joining these two plane mirrors being substantially parallel to the optical axis of said solar-simulation device and external therefrom;
 a prism with multiple faces the axis of which is common with that of said simulation device and each face of which is disposed in front of one of said second plane mirrors;
 a collector lens provided with a diaphragm and the optical axis of which is common to that of said simulation device; and
 a collimation device comprising said collector lens and a projection device having an objective lens for the projection of the light on a target, said collector lens being disposed at the focal point of said projection device.

2. An optical solar simulation device according to claim 1, in which the collimation device further comprises a device for the uniformization of the luminance and the magnitude, constituted by two convergent lens following said collector lens, the first one provided for giving an image of said collector lens on the second one disposed at the focal point of the objective.

3. An optical solar-simulation device for the indication of large surfaces comprising
 a single light source;

a radiation condenser device disposed around said light source and constituted by the whole of a plurality of elementary condenser systems of small opening each comprising a spherical mirror centered on said source and arranged behind said source, and a condenser lens positioned in front of said light source for receiving light from said spherical mirror;

an optical collimation device of the optical axis of which is common with that of said radiation condenser device;

a prism with multiple faces for receiving light from said elementary condenser systems and uniformly illuminating said optical collimation device;

a first parabolic mirror having a common optical axis with said radiation condenser device, and a second parabolic mirror the optical axis and the focal points of which are coincident with those of said first parabolic mirror.

References Cited

UNITED STATES PATENTS

| | | | |
|---|---|---|---|
| 984,929 | 2/1911 | Kellner | 240—41.3 X |
| 1,887,650 | 11/1932 | Larner | 240—41.3 X |
| 2,190,294 | 2/1940 | Mili | 240—1.1 X |
| 3,202,811 | 8/1965 | Hall | 240—1.1 |
| 3,225,188 | 12/1965 | Le Vantine | 240—1.1 |
| 3,247,367 | 4/1966 | Raycees | 240—1.1 X |
| 3,379,067 | 4/1968 | Wallace | 240—1.1 X |

FOREIGN PATENTS 302,656  10/1929  Great Britain.

NORTON ANSHER, Primary Examiner

M. H. HAYES, Assistant Examiner

U.S. Cl. X.R.

240—41.3